(12) United States Patent
Morioka

(10) Patent No.: US 9,204,297 B2
(45) Date of Patent: *Dec. 1, 2015

(54) INFORMATION PROCESSING APPARATUS, INFORMATION PROCESSING METHOD, OPERATION TERMINAL, AND INFORMATION PROCESSING SYSTEM

(71) Applicant: Sony Corporation, Tokyo (JP)

(72) Inventor: Yuichi Morioka, Tokyo (JP)

(73) Assignee: Sony Corporation, Tokyo (JP)

( * ) Notice: Subject to any disclaimer, the term of this patent is extended or adjusted under 35 U.S.C. 154(b) by 70 days.

This patent is subject to a terminal disclaimer.

(21) Appl. No.: 14/062,581

(22) Filed: Oct. 24, 2013

(65) Prior Publication Data

US 2014/0050323 A1     Feb. 20, 2014

Related U.S. Application Data

(63) Continuation of application No. 13/387,152, filed as application No. PCT/JP2010/062434 on Jul. 23, 2010, now Pat. No. 8,611,538.

(30) Foreign Application Priority Data

Aug. 7, 2009   (JP) ................. 2009-185053

(51) Int. Cl.
H04L 29/00         (2006.01)
H04W 12/04         (2009.01)
(Continued)

(52) U.S. Cl.
CPC .............. *H04W 12/04* (2013.01); *H04L 9/0827* (2013.01); *H04L 63/105* (2013.01); *H04N 21/42207* (2013.01); *H04N 21/4367* (2013.01); *H04W 52/0212* (2013.01)

(58) Field of Classification Search
CPC   H04L 9/0827; H04L 63/105; H04N 21/4367; H04N 21/42207; H04W 12/04; H04W 52/0212

See application file for complete search history.

(56) References Cited

U.S. PATENT DOCUMENTS 6,182,214 B1   1/2001  Hardjono
2002/0115426 A1  8/2002  Olson et al.
(Continued)

FOREIGN PATENT DOCUMENTS

CN      101184010 A    5/2008
EP      1 720 296 A1   11/2006
(Continued)

OTHER PUBLICATIONS

Schneier et al., Applied Cryptography. Selbsttatige Regelung. Theoretische Grundlagen Mit Praktischen Beisplielen. Jan. 1, 1996; XP002137412 p. 71-73, 528-531.

(Continued)

*Primary Examiner* — Michael Pyzocha
(74) *Attorney, Agent, or Firm* — Sony Corporation

(57) ABSTRACT

Provided is an information processing apparatus including a security level determination section which determines a security level at a time of transmitting a key to an operation terminal, as a transmission security level, a transmission power determination section which determines a transmission power in accordance with the transmission security level and a key-dividing number included in a key transmission request, a key acquisition section which acquires each key fragment by dividing the key into the key-dividing number, and a transmission section which transmits the each key fragment acquired by the key acquisition section using the transmission power determined by the transmission power determination section, via a wireless signal to the operation terminal.

15 Claims, 9 Drawing Sheets

141

| KEY-DIVIDING NUMBER (N) | SECURITY LEVEL | TRANSMISSION POWER |
|---|---|---|
| N<10 | LOW | NOT ADJUSTED |
| N≥10 | LOW | INCREASED |
| N: ANY | NORMAL | NOT ADJUSTED |
| N≥100 | HIGH | NOT ADJUSTED |
| N<100 | HIGH | DECREASED |

(51) Int. Cl.
*H04L 9/08* (2006.01)
*H04N 21/422* (2011.01)
*H04N 21/4367* (2011.01)
*H04L 29/06* (2006.01)
*H04W 52/02* (2009.01)

(56) References Cited

U.S. PATENT DOCUMENTS

| | | |
|---|---|---|
| 2006/0133338 A1 | 6/2006 | Reznik et al. |
| 2006/0173848 A1 | 8/2006 | Peterson et al. |
| 2007/0149237 A1 | 6/2007 | Russell et al. |
| 2008/0089519 A1 | 4/2008 | Ekberg |
| 2008/0253772 A1 | 10/2008 | Katsuyama |
| 2008/0298302 A1 | 12/2008 | Ishida |
| 2009/0060198 A1 | 3/2009 | Little |
| 2010/0052870 A1 | 3/2010 | King |
| 2012/0121089 A1 | 5/2012 | Morioka |

FOREIGN PATENT DOCUMENTS

| | | |
|---|---|---|
| JP | 2003-187394 A | 7/2003 |
| JP | 2004-350044 A | 12/2004 |
| JP | 2007-274388 A | 10/2007 |
| JP | 2009-055402 A | 3/2009 |
| WO | WO 2008/044155 A2 | 4/2008 |

OTHER PUBLICATIONS

Japanese Office Action issued Sep. 24, 2013 in connection with Japanese Application No. 2009-185053 and English translation thereof, p. 1-3.

Extended European Search Report mailed Apr. 4, 2013, in connection with European Application No. 1086348.8, p. 1-8.

Chinese Office Action issued Jan. 6, 2014 in connection with Chinese Application No. 2010-80034213.6.

| KEY-DIVIDING NUMBER (N) | SECURITY LEVEL | TRANSMISSION POWER |
|---|---|---|
| N<10 | LOW | NOT ADJUSTED |
| N≥10 | LOW | INCREASED |
| N: ANY | NORMAL | NOT ADJUSTED |
| N≥100 | HIGH | NOT ADJUSTED |
| N<100 | HIGH | DECREASED |

# INFORMATION PROCESSING APPARATUS, INFORMATION PROCESSING METHOD, OPERATION TERMINAL, AND INFORMATION PROCESSING SYSTEM

CROSS REFERENCES TO RELATED APPLICATIONS

The present invention is a continuation of U.S. patent application Ser. No. 13/387,152, filed on Jan. 26, 2012, which claims the priority benefit to International Application No. PCT/JP2010/062434, filed in the Japanese Patent Office as a Receiving Office on Jul. 23, 2010, which claims the priority benefit of Japanese Patent Application Number 2009-185053, filed in the Japanese Patent Office on Aug. 7, 2009, which are hereby incorporated by reference to the maximum extent allowable by law.

TECHNICAL FIELD

The present invention relates to an information processing apparatus, an information processing method, an operation terminal, and an information processing system.

BACKGROUND ART

In recent years, an RF (Radio Frequency) remote control is gaining widespread use, which enables an information processing apparatus to execute processing in accordance with an instruction from a user by transmitting a radio wave to an information processing apparatus such as a television set. Further, attempts to standardize the RF remote control are conducted by organizations.

For example, in accordance with near field communication standard IEEE (registered trademark) (Institute of Electrical and Electronic Engineers) 802.15.4, ZigBee (registered trademark) is standardized as specifications for a network layer, a security layer, and an application layer, which correspond to upper layer of IEEE (registered trademark) 802.15.4. The specification of ZigBee (registered trademark) is approved by ZigBee (registered trademark) Alliance as version 1.0. IEEE (registered trademark) 802.15.4 is completed at Standardization Committee of IEEE (registered trademark) as specifications for a physical layer and a MAC (Media Access Control) layer.

In addition, based on IEEE (registered trademark) 802.15.4, RF remote control standard ZigBee (registered trademark) RF4CE (Radio Frequency for Consumer Electronics) v1.0 spec is standardized by trade organizations. According to this standard, in order to prevent operation information input to a remote control by the user from being read and misused by a third party such as a neighbor, a key (encryption key) is shared between the remote control and the information processing apparatus desired by the user. The key is used mainly when operation information, credit card information, and the like are transmitted from the remote control to the television set, and works in a manner that the third party who does not know the key cannot intercept those pieces of information.

In receiving a key transmission request from the remote control (hereinafter, also referred to as "operation terminal"), the information processing apparatus such as the television set transmits elements of a key called key fragments, the number of which is equal to a key-dividing number (fragment number) written in the key transmission request, to the remote control. The remote control which has received the key fragments performs an exclusive OR of all elements, and acquires a final key. In general, a monitor, who is present at the other side of a wall or the like from the information processing apparatus and the remote control, does not have a satisfactory propagation path of a transmitted/received radio wave with the information processing apparatus or the remote control, and hence, cannot receive all of those key fragments without error and cannot receive a key.

There are disclosed various technologies for generating key fragments and transmitting the generated key fragments (for example, refer to Patent Literature 1).

CITATION LIST

Patent Literature

Patent Literature 1: JP 2009-55402A

SUMMARY OF INVENTION

Technical Problem

However, in the technology described above in which the remote control determines the key-dividing number, the probability that the monitor is unsuccessful in receiving a key fragment depends on the key-dividing number determined at the remote control side. That is, it can be said that the security strength of communication between the remote control and the information processing apparatus is determined in accordance with the key-dividing number. In the case where the key-dividing number is kept small in response to a request such as battery saving or calculation amount reduction, however, there was a problem that the security of communication in the remote control was not maintained. Further, in practice, it is generally the information processing apparatus that grasps the degree of importance of the operation information input by the user, and there was a problem that an imbalance occurred in the right to determine the security strength.

Accordingly, the present invention has been made in the above-mentioned problem, and an object of the present invention is to provide a novel and improved technology that enables the information processing apparatus to have the right to determine the security strength of communication between the operation terminal and the information processing apparatus, in an information processing system in which a key is divided in accordance with the key-dividing number specified by the operation terminal and returned by the information processing apparatus.

Solution to Problem

According to an aspect of the present invention, in order to achieve the above-mentioned object, there is provided an information processing apparatus including a storage section which stores a key used for encrypting or decrypting data, a reception section which receives a key transmission request including a key-dividing number via a wireless signal from an operation terminal, a key transmission request acquisition section which acquires the key transmission request from the wireless signal received by the reception section, a security level determination section which determines a security level at a time of transmitting the key to the operation terminal, as a transmission security level, a transmission power determination section which determines a transmission power in accordance with the transmission security level determined by the security level determination section and the key-dividing number included in the key transmission request acquired by the key transmission request acquisition section, a key acquisition section which acquires each key fragment by dividing the key stored in the storage section into the key-dividing number, and a transmission section which transmits the each key fragment acquired by the key acquisition section using the transmission power determined by the transmission power determination section, via a wireless signal to the operation terminal.

The storage section may further store a first key-dividing number and a first security level. The transmission power determination section may further acquire the first key-dividing number and the first security level which are stored in the storage section, and, in a case where a first condition is satisfied, that the transmission security level determined by the security level determination section is equal to or higher than the first security level and the key-dividing number included in the key transmission request is smaller than the first key-dividing number, the transmission power determination section may determine the transmission power as a value that is smaller than the transmission power used in a case where the first condition is not satisfied.

The storage section may further store a second key-dividing number and a second security level. The transmission power determination section may acquire the second key-dividing number and the second security level which are stored in the storage section, and, in a case where a second condition is satisfied, that the transmission security level determined by the security level determination section is equal to or lower than the second security level and the key-dividing number included in the key transmission request is equal to or larger than the second key-dividing number, the transmission power determination section may determine the transmission power as a value that is larger than the transmission power used in a case where the second condition is not satisfied.

The information processing apparatus may further include a processing request acquisition section and a processing execution section. After receiving the key transmission request, the reception section may further receive an encrypted processing request obtained by encrypting a processing request using a key generated by the operation terminal based on the each key fragment, from the operation terminal via a wireless signal. The processing request acquisition section may acquire the encrypted processing request from the wireless signal received by the reception section. The processing execution section may decrypt the encrypted processing request using the key stored in the storage section, and may execute processing in accordance with the processing request obtained by the decryption.

The transmission power determination section may register, in the storage section, the key-dividing number included in the key transmission request acquired by the key transmission request acquisition section. The processing request acquisition section may acquire, from the wireless signal received by the reception section, an encrypted processing request obtained by encrypting a processing request, using a key generated by the operation terminal by performing a bitwise exclusive OR with respect to of all of each of the key fragments. The processing execution section may decrypt the encrypted processing request using a key generated by performing a bitwise exclusive OR with respect to all of each of key fragments obtained by dividing the key stored in the storage section into the key-dividing number stored in the storage section, and may execute processing in accordance with the processing request obtained by the decryption.

The storage section may further store an application which is activated for executing the processing by the processing execution section. The security level determination section may determine the transmission security level in accordance with a type of the application.

The information processing apparatus may further include a pairing request acquisition section, a pairing processing section, and a key-requesting terminal determination section. Before receiving the key transmission request, the reception section may further receive a pairing request including model identification information for identifying a model of the operation terminal and operation terminal identification information for identifying the operation terminal, from the operation terminal via a wireless signal. The pairing request acquisition section may acquire the pairing request from the wireless signal received by the reception section. In a case where the model identification information included in the pairing request acquired by the pairing request acquisition section is predetermined model identification information, the pairing processing section may register the operation terminal identification information as communication-allowed terminal information in the storage section. The key-requesting terminal determination section may determine whether operation terminal identification information included in the key transmission request acquired by the key transmission request acquisition section is registered as the communication-allowed terminal information in the storage section. In a case where the key-requesting terminal determination section determines that the operation terminal identification information included in the key transmission request is not registered as the communication-allowed terminal information in the storage section, the transmission section may not transmit the each key fragment to the operation terminal via a wireless signal.

In a case where the pairing request further includes performance information indicating performance of the operation terminal, the pairing processing section may further register the performance information in association with the communication-allowed terminal information in the storage section. The security level determination section may determine the transmission security level in accordance with the performance information registered in association with the communication-allowed terminal information in the storage section.

The transmission power determination section may register, in the storage section, the key-dividing number included in the key transmission request acquired by the key transmission request acquisition section and the determined transmission power, as a previous key-dividing number and a previous transmission power, respectively. In a case where the processing execution section is unsuccessful in decrypting the encrypted processing request, the transmission power determination section may acquire once again the key-dividing number included in the key transmission request acquired by the key transmission request acquisition section. The transmission power determination section may calculate a difference value between the acquired key-dividing number and the previous key-dividing number registered in the storage section. In a case where the calculated difference value is equal to or less than a predetermined value, the transmission power determination section may determine as a value larger than the previous transmission power registered in the storage section.

The storage section may further store environment identification information for identifying an environment in which an own device is installed. The security level determination section may determine the transmission security level in accordance with the environment identification information.

The security level determination section may determine the transmission security level in accordance with a reception power of the wireless signal at a time when the reception section receives the key transmission request via the wireless signal.

The information processing apparatus may further include a display section and a display control section. The display control section may cause the display section to display at least one of the transmission security level determined by the security level determination section, the key-dividing number included in the key transmission request acquired by the key transmission request acquisition section, or the transmission power determined by the transmission power determination section.

Advantageous Effects of Invention

According to the present invention described above, it is possible to cause the information processing apparatus to have the right to determine the security strength of communication between the operation terminal and the information processing apparatus, in the information processing system in which a key is divided in accordance with the key-dividing number specified by the operation terminal and returned by the information processing apparatus.

BRIEF DESCRIPTION OF DRAWINGS

FIG. 7 is a diagram showing a configuration example of association information held by the information processing apparatus.

DESCRIPTION OF EMBODIMENTS

Hereinafter, preferred embodiments of the present invention will be described in detail with reference to the appended drawings. Note that, in this specification and the drawings, elements that have substantially the same function and structure are denoted with the same reference signs, and repeated explanation is omitted. Note that the description will be given in the following order.

1. First Embodiment
  1-1. Example of application of information processing system
  1-2. Transmission of key transmission request and key fragments
  1-3. Case in which transmission of key fragments is successful
  1-4. Case in which transmission of key fragments is unsuccessful
  1-5. Configuration of information processing apparatus
  1-6. Configuration of operation terminal
  1-7. Configuration example of association information held by information processing apparatus
  1-8. Flow of processing executed by information processing system
  1-9. Flow of processing executed by information processing apparatus
2. Modified Example
3. Summary <1. First Embodiment>

A first embodiment of the present invention will be described.

[1-1. Example of Application of Information Processing System]

Figure 1:
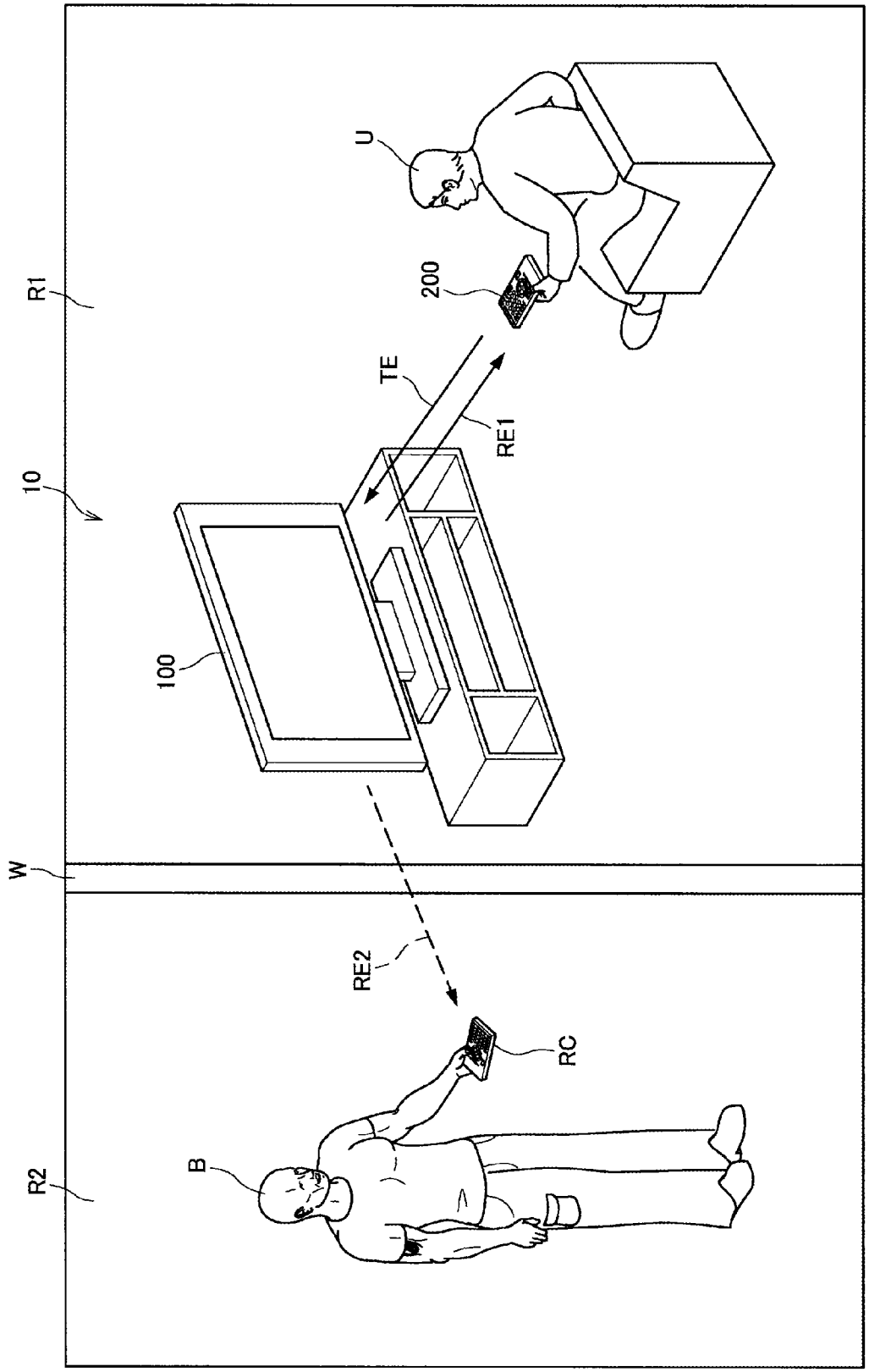
FIG. 1 is a diagram showing an example of application of an information processing system according to the present embodiment.

FIG. 1 is a diagram showing an example of application of an information processing system according to the present embodiment. With reference to FIG. 1 (refer to other figures as appropriate), the example of the application of the information processing system according to the present embodiment will be described.

As shown in FIG. 1, an information processing system 10 according to the present embodiment includes an information processing apparatus 100 and an operation terminal 200. The information processing apparatus 100 receives a wireless signal TE using a radio wave from the operation terminal 200, performs processing in accordance with a request included in the received wireless signal TE, and returns a processing result to the operation terminal 200 by causing the processing result to be included in a wireless signal RE1 using a radio wave. Here, as shown in FIG. 1, it can be assumed that the information processing apparatus 100 is, for example, the television set, but is not limited to the television set. The information processing apparatus 100 may be any as long as it has functions of receiving the wireless signal TE from the operation terminal 200, performing processing in accordance with the request included in the received wireless signal TE, and returning the processing result to the operation terminal 200 by causing the processing result to be included in the wireless signal RE1, and the information processing apparatus 100 may be a recording/reproducing apparatus for a TV program, for example.

The operation terminal 200 accepts the input of operation information performed by a user U, generates a request based on the operation information the input of which is accepted, and transmits the generated request to the information processing apparatus 100 by causing the generated request to be included in the wireless signal TE. Further, the operation terminal 200 receives the wireless signal RE1 from the information processing apparatus 100 as a response to the wireless signal TE. It can be assumed that the operation terminal 200 is, for example, the RF remote control as described above, but is not particularly limited to the RF remote control. For example, the operation terminal 200 may be any as long as it has a function of accepting the input of operation information and transmitting the request based on the operation information to the information processing apparatus 100 by causing the request to be included in the wireless signal TE, and has a function of receiving the wireless signal RE1 from the information processing apparatus 100 as a response to the wireless signal TE.

Further, as described above, in order to prevent operation information input to the operation terminal 200 by the user U from being read by an operation terminal RC held by a monitor B and being misused, a key is shared between the operation terminal 200 and the information processing apparatus 100 desired by the user U. According to ZigBee (registered trademark) RF4CE v1.0 spec, for example, the key is used mainly when operation information, credit card information, and the like are transmitted from the operation terminal 200 to the information processing apparatus 100, and works in a manner that the monitor B who does not know the key cannot intercept those pieces of information.

In receiving a key transmission request from the operation terminal 200 via the wireless signal TE, the information processing apparatus 100 transmits key fragments obtained by dividing the key into the key-dividing number included in the key transmission request, to the operation terminal 200. The operation terminal 200 which has received the key fragments receives all of the key fragments and acquires the key based on all of the received key fragments. In general, the operation terminal RC held by the monitor B, who is present at the other side of a wall W or the like from the information processing apparatus 100 and the operation terminal 200, does not have a satisfactory propagation path of a transmitted/received radio wave with the information processing apparatus 100 or the operation terminal 200, and hence, cannot receive all of those key fragments without error and cannot receive a key.

However, in the case of succeeding in reading out the key by receiving a wireless signal RE2 from the information processing apparatus 100, the operation terminal RC held by the monitor B can intercept information such as the operation information and the credit card information. Here, although there can be assumed the case where the monitor B is present in a room R2, which is at the other side of the wall W from a room R1 in which the user U is present, the case is not limited thereto, and the place for the monitor B to be present may be anywhere. For example, the monitor B may be present outside the house in which the user U is present.

When it is only the operation terminal 200 that determines the key-dividing number, the probability that the reception of a key fragment performed by the operation terminal RC held by the monitor B is unsuccessful depends only on the key-dividing number determined at the operation terminal 200 side. That is, it can be said that the security strength of communication between the operation terminal 200 and the information processing apparatus 100 is determined in accordance with the key-dividing number. In the case where the key-dividing number is kept small in response to a request such as battery saving or calculation amount reduction, however, the security of communication in the remote control is not maintained. Further, in practice, it is generally the information processing apparatus 100 that grasps the degree of importance of the operation information input by the user U, and an imbalance occurred in the right to determine the security strength.

In the present embodiment, there is described technology that enables the information processing apparatus 100 to have the right to determine the security strength of communication between the operation terminal 200 and the information processing apparatus 100, in the information processing apparatus 100 in which a key is divided in accordance with the key-dividing number specified by the operation terminal 200 and returned by the information processing apparatus 100. Further, although the description is made on the premise that a plaintext bit string that is not encrypted is used for the key itself, an encrypted key may also be used.

As a specific example, in the case where the key-dividing number transmitted by the operation terminal 200 is not a sufficient value for maintaining the security of communication, a case can be assumed that the information processing apparatus 100 performs control such that a transmission power used for transmitting the key fragments is decreased. With the decrease in the transmission power, the probability can be increased that a transmission error occurs until a key fragment reaches the operation terminal RC held by the monitor B from the information processing apparatus 100, even in the case where the key-dividing number specified by the operation terminal 200 is small. That is, the probability that the key is stolen by the monitor B can be reduced.

In this regard, when the transmission power is decreased too much, this time, the possibility becomes high more than necessary, that the transmission error occurs with the operation terminal 200 which corresponds to the desired communication partner for the information processing apparatus 100. As a result, the key cannot be transmitted correctly from the information processing apparatus 100 to the operation terminal 200. In order to avoid falling into such a state, in the case where the operation terminal 200 notifies the information processing apparatus 100 of a key-dividing number that is too large, the transmission power used when transmitting the key fragments may be increased. In this way, it becomes possible for the information processing apparatus 100 to more reliably transmit the key to the operation terminal 200.

Further, after the transmission of the key is unsuccessful once, in the case where the operation terminal 200 is requested for the transmission of the key with the same (or approximate) key-dividing number again, the information processing apparatus 100 may increase the transmission power used for the transmission of the next key, and may increase the probability that the transmission of the key is successful.

[1-2. Transmission of Key Transmission Request and Key Fragments]

Figure 2:
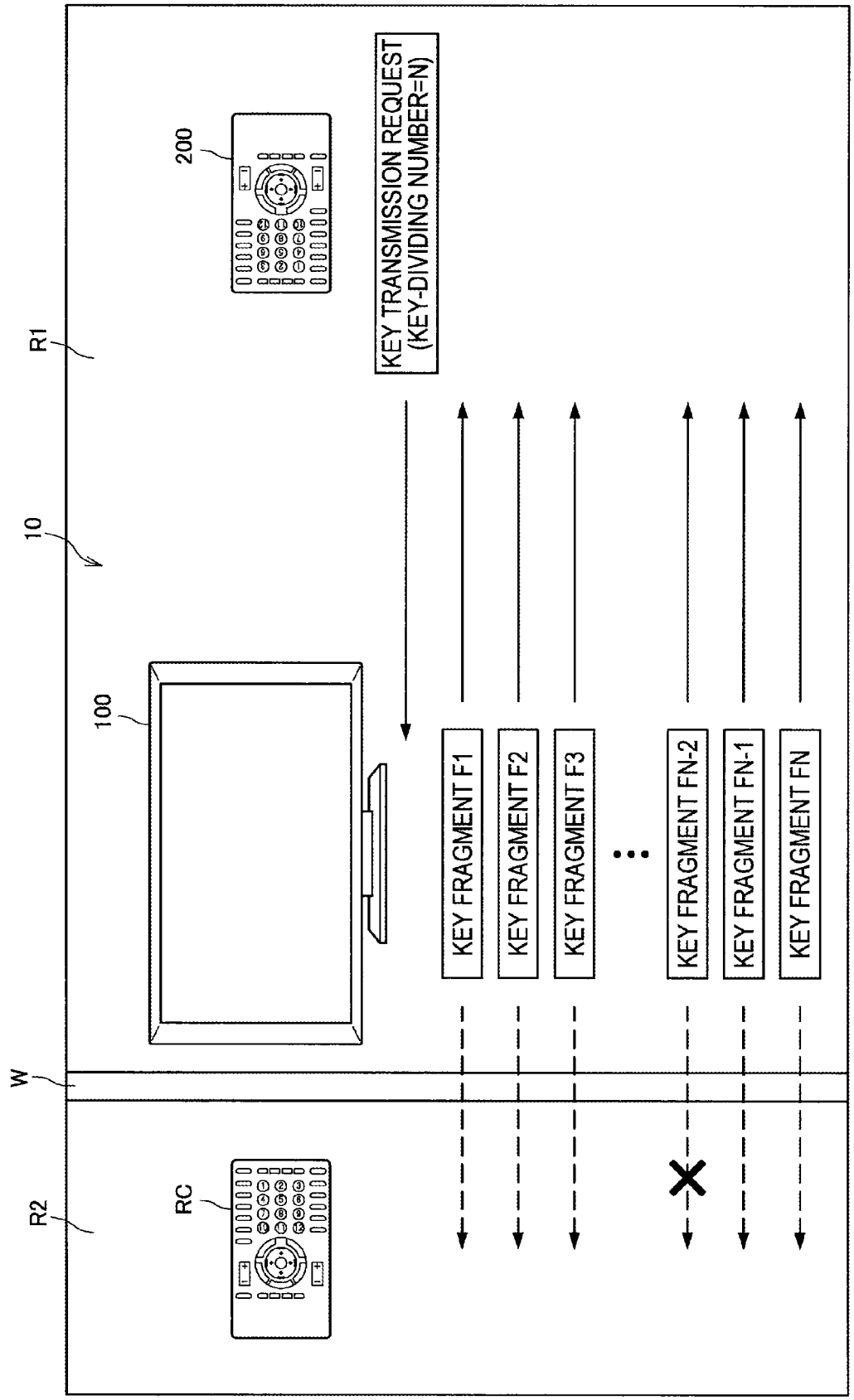
FIG. 2 is a diagram illustrating transmission of a key transmission request and key fragments.

FIG. 2 is a diagram illustrating transmission of a key transmission request and key fragments. With reference to FIG. 2 (refer to other figures as appropriate), the transmission of the key transmission request and the key fragments will be described.

As shown in FIG. 2, let us assume that the operation terminal 200 transmits, to the information processing apparatus 100, a key transmission request including N as a key-dividing number. The information processing apparatus 100 transmits, to the operation terminal 200, key fragments (key fragment F1, F2, . . . FN) obtained by dividing a key into N pieces in accordance with the key transmission request transmitted from the operation terminal 200. Further, the operation terminal RC held by the monitor B also attempts to receive the key fragments (key fragment F1, F2, . . . FN). Here, in the case where the transmission power used by the information processing apparatus 100 for transmitting the key is appropriately maintained, the operation terminal 200 succeeds in receiving the key fragments (key fragment F1, F2, . . . FN), for example, but the operation terminal RC is unsuccessful in receiving some or all of the key fragments (key fragment F1, F2, . . . FN). FIG. 2 shows an example in which the reception of a key fragment FN-2 is unsuccessful.

[1-3. Case in which Transmission of Key Fragments is Successful]

Figure 3:
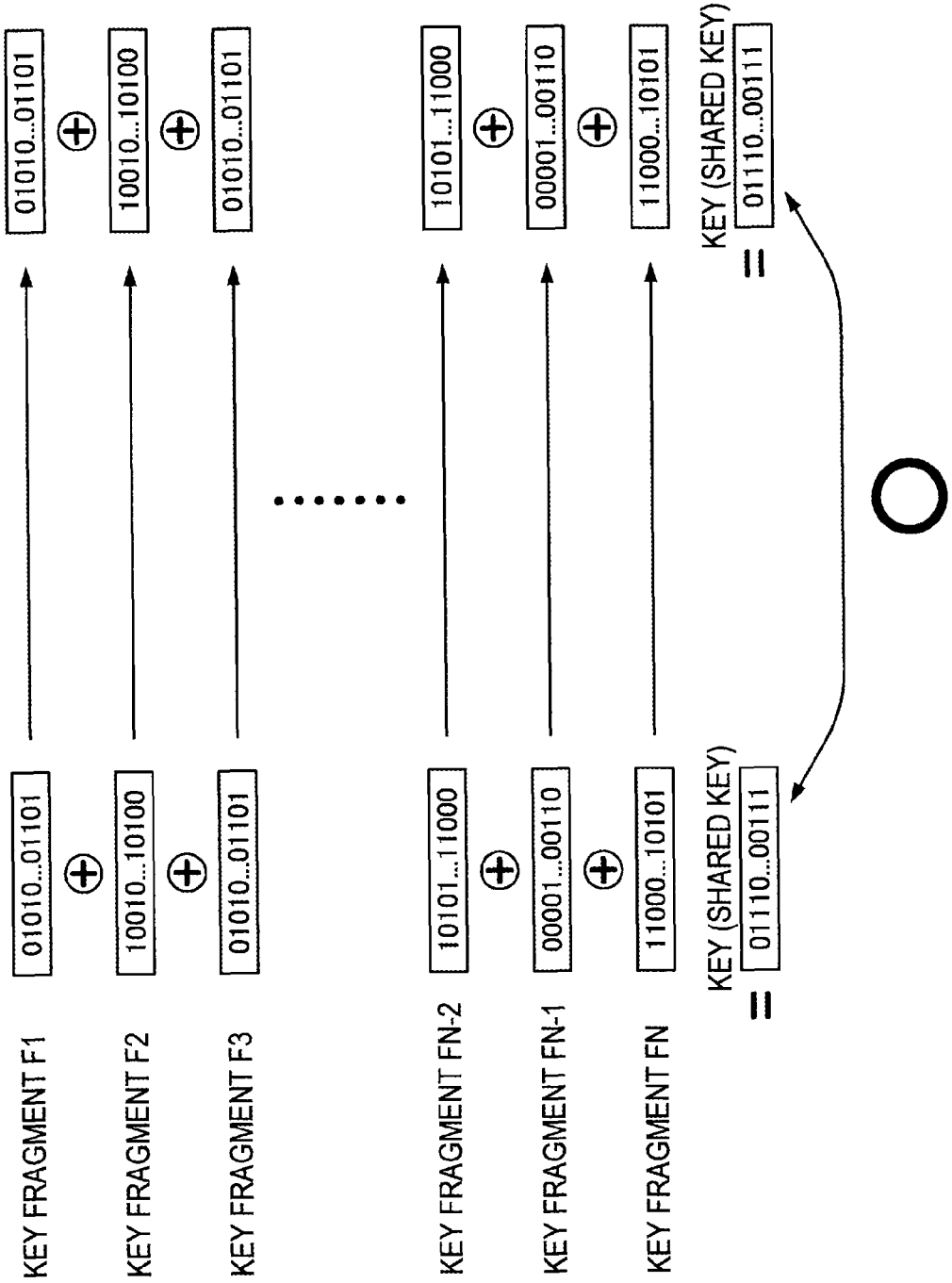
FIG. 3 is a diagram illustrating an example of a case where the transmission of the key fragments is successful.

FIG. 3 is a diagram illustrating an example of a case where the transmission of the key fragments is successful. With reference to FIG. 3 (refer to other figures as appropriate), there will be described the case where the transmission of the key fragments is successful.

As shown in FIG. 2, let us assume that the transmission of all the key fragments (key fragment F1, F2, . . . FN) from the information processing apparatus 100 to the operation terminal 200 is successful. In that case, as shown in FIG. 3, the information processing apparatus 100 and the operation terminal 200 each hold the same key fragments (key fragment F1, F2, . . . FN). If the information processing apparatus 100 and the operation terminal 200 each hold the same key fragments (key fragment F1, F2, ... FN), a same key can be generated based on the key fragments (key fragment F1, F2, ... FN), and the same key (shared key) can be shared between the information processing apparatus 100 and the operation terminal 200. Although FIG. 3 shows an example in which the information processing apparatus 100 and the operation terminal 200 each generate a key by performing a bitwise exclusive OR of the key fragments (key fragment F1, F2, ... FN), the way of generating the key is not limited to the technology of performing the exclusive OR.

[1-4. Case in which Transmission of Key Fragments is Unsuccessful]

Figure 4:
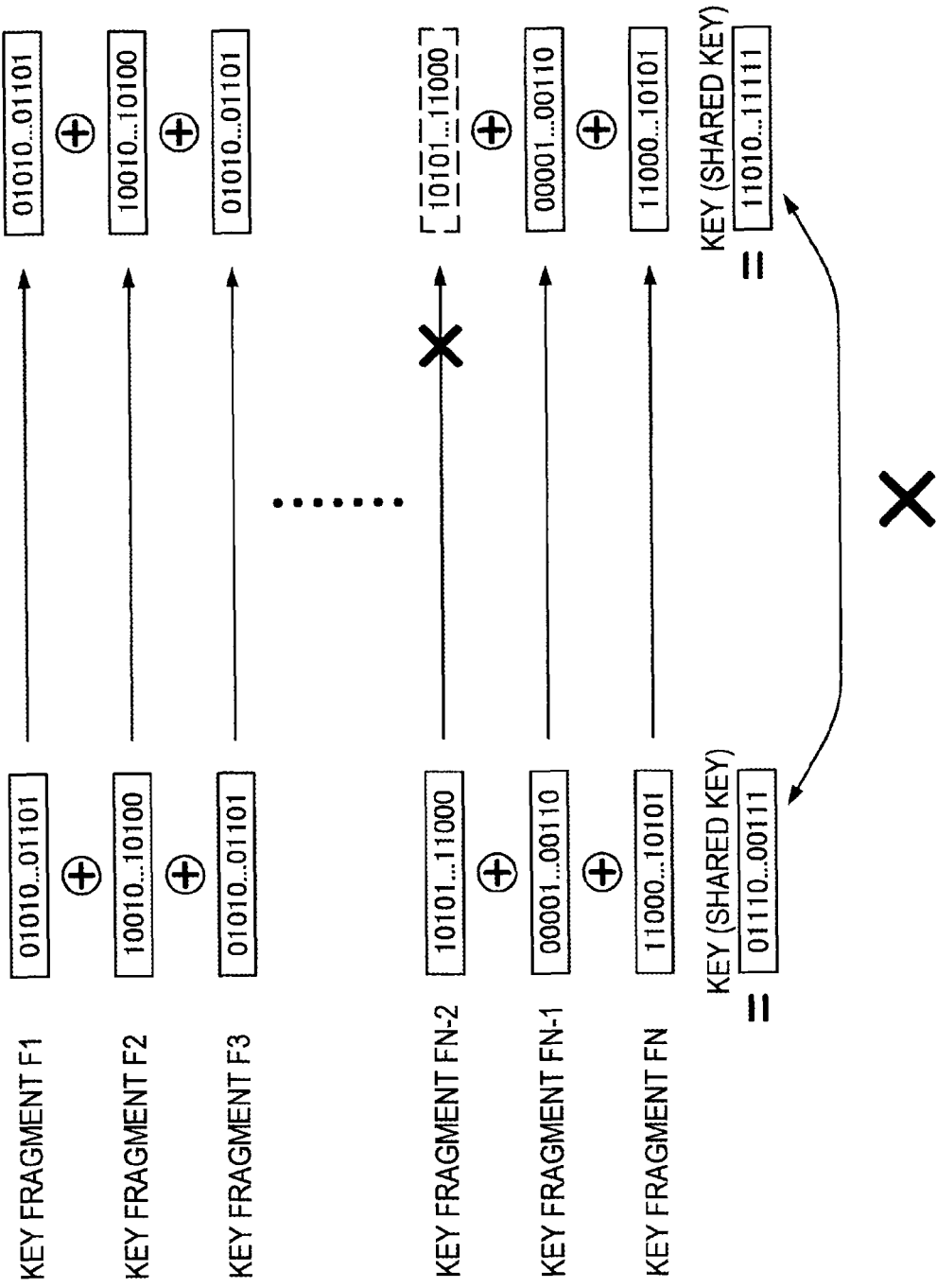
FIG. 4 is a diagram illustrating an example of a case where the transmission of the key fragments is unsuccessful.

FIG. 4 is a diagram illustrating an example of a case where the transmission of the key fragments is unsuccessful. With reference to FIG. 4 (refer to other figures as appropriate), there will be described the case where the transmission of the key fragments is unsuccessful.

As shown in FIG. 2, let us assume that, in the transmission of the key fragments (key fragment F1, F2, ... FN) from the information processing apparatus 100 to the operation terminal RC, the transmission of the key fragment FN-2 is unsuccessful. In that case, as shown in FIG. 4, the operation terminal RC cannot hold the key fragment FN-2. Since the operation terminal RC cannot hold the key fragment FN-2, the information processing apparatus 100 and the operation terminal RC cannot share the same key (shared key). Although FIG. 4 shows an example in which the information processing apparatus 100 and the operation terminal RC each generate a key by performing a bitwise exclusive OR of the key fragments, the way of generating the key is not limited to the technology of performing the exclusive OR.

[1-5. Configuration of Information Processing Apparatus]

Figure 5:
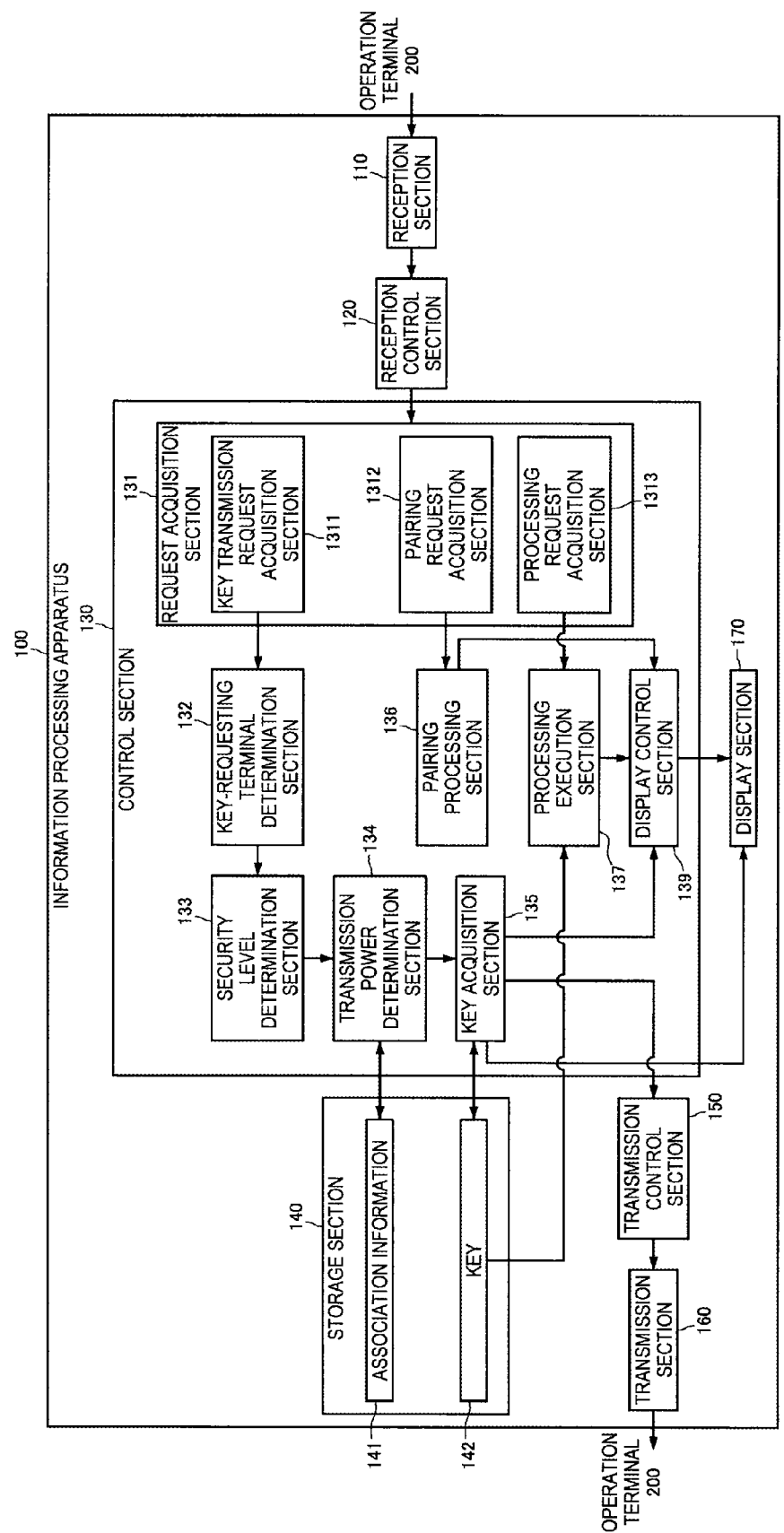
FIG. 5 is a diagram showing a configuration of an information processing apparatus according to the present embodiment.

FIG. 5 is a diagram showing a configuration of the information processing apparatus according to the present embodiment. With reference to FIG. 5 (refer to other figures as appropriate), the configuration of the information processing apparatus according to the present embodiment will be described.

As shown in FIG. 5, the information processing apparatus 100 includes at least a reception section 110, a control section 130, a storage section 140, and a transmission section 160. Further, the information processing apparatus 100 includes, as necessary, a reception control section 120, a transmission control section 150, a display section 170, and the like.

Further, the control section 130 includes at least a request acquisition section 131, a security level determination section 133, a transmission power determination section 134, and a key acquisition section 135, and includes, as necessary, a key-requesting terminal determination section 132, a pairing processing section 136, a processing execution section 137, a display control section 139, and the like. The control section 130 is configured from, for example, a CPU (Central Processing Unit), a RAM (Random Access Memory), and the like, and the function thereof is realized by reading and developing in the RAM a program stored in the storage device 140 and executing the program developed in the RAM. Further, the control section 130 may be configured from dedicated hardware, for example.

The request acquisition section 131 includes at least a key transmission request acquisition section 1311, and includes, as necessary, a pairing request acquisition section 1312 and a processing request acquisition section 1313.

The reception section 110 is configured from an antenna and the like, and receives a wireless signal from the operation terminal 200. For example, the reception section 110 receives a key transmission request including a key-dividing number via a wireless signal from the operation terminal 200. For example, the key-dividing number may be set at a predetermined position of the key transmission request. The predetermined position of the key transmission request is not particularly limited, and may be the head of the key transmission request or may be a predetermined number of bits posterior to the head of the key transmission request.

The reception control section 120 performs, to the wireless signal received by the reception section 110, frequency conversion from a high-frequency signal into a baseband signal by downconversion as necessary, and demodulates the frequency-converted baseband signal. Further, in the case where the control section 130 performs processing using a digital signal, the reception control section 120 converts an analog signal obtained by the demodulation into a digital signal.

The storage section 140 is configured from a storage device such as an HDD (Hard Disk Drive), and stores association information 141 and a key 142 which is used for encrypting or decrypting data. Further, in the case where the control section 130 is configured from the CPU (Central Processing Unit), the RAM (Random Access Memory), or the like, the storage section 140 also has a function of storing a program to be executed by the control section 130 and various types of data to be used when a program is executed by the control section 130.

The key transmission request acquisition section 1311 acquires a key transmission request from the wireless signal received by the reception section 110. The technique of acquiring the key transmission request by the key transmission request acquisition section 1311 is not particularly limited, and, for example, in the case where a value set at a predetermined position of the wireless signal received by the reception section 110 is a value indicating the key transmission request, the request acquisition section 131 can acquire the wireless signal extracted as the key transmission request.

The security level determination section 133 determines a security level at the time of transmitting the key to the operation terminal 200, as a transmission security level. The determination of the transmission security level performed by the security level determination section 133 will be described below.

The transmission power determination section 134 determines a transmission power in accordance with the transmission security level determined by the security level determination section 133 and the key-dividing number included in the key transmission request acquired by the key transmission request acquisition section 1311.

The key acquisition section 135 acquires each key fragment by dividing the key 142 stored in the storage section 140 into the key-dividing number. When dividing the key 142 into the key-dividing number, it is assumed that the key 142 is divided equally into the key-dividing number, for example. However, assuming that the division is performed based on an identical algorithm in the information processing apparatus 100 and the operation terminal 200, the equal division may not be performed.

The transmission section 160 is configured from an antenna or the like that is the same as or different from the reception section 110, and transmits each key fragment acquired by the key acquisition section 135 using the transmission power determined by the transmission power determination section 134, via a wireless signal to the operation terminal 200.

In the case where the control section 130 performs processing using a digital signal, the transmission control section 150 converts a digital signal to be transmitted into an analog signal. Further, the transmission control section 150 modulates the analog signal as necessary, performs frequency conversion from the baseband signal obtained by the modulation into a high-frequency signal by upconversion, and outputs the high-frequency signal to the transmission section 160.

The storage section 140 may further store a first key-dividing number and a first security level. In that case, the transmission power determination section 134 acquires the first key-dividing number and the first security level which are stored in the storage section 140. Then, in the case where a first condition is satisfied, that the transmission security level determined by the security level determination section 133 is equal to or higher than the first security level and the key-dividing number included in the key transmission request is smaller than the first key-dividing number, the transmission power determination section 134 determines the transmission power as a value that is smaller than the transmission power used in the case where the first condition is not satisfied.

For example, the first key-dividing number is set to "100" for "key-dividing number N" of the association information 141, and, for example, the first security level is set to "high" for "security level" of the association information 141 (for example, refer to FIG. 7).

Further, the storage section 140 may further store a second key-dividing number and a second security level. In that case, the transmission power determination section 134 acquires the second key-dividing number and the second security level which are stored in the storage section 140. Then, in the case where a second condition is satisfied, that the transmission security level determined by the security level determination section 133 is equal to or lower than the second security level and the key-dividing number included in the key transmission request is equal to or larger than the second key-dividing number, the transmission power determination section 134 determines the transmission power as a value that is larger than the transmission power used in the case where the second condition is not satisfied.

For example, the second key-dividing number is set to "10" for "key-dividing number N" of the association information 141, and, for example, the second security level is set to "low" for "security level" of the association information 141 (for example, refer to FIG. 7).

The information processing apparatus 100 may further include the processing request acquisition section 1313 and the processing execution section 137. In that case, after receiving the key transmission request, the reception section 110 further receives an encrypted processing request obtained by encrypting a processing request using a key generated by the operation terminal 200 based on each key fragment, from the operation terminal 200 via a wireless signal. The processing request acquisition section 1313 may acquire the encrypted processing request from the wireless signal received by the reception section 110, and the processing execution section 137 may decrypt the encrypted processing request using the key 142 stored in the storage section 140 and may execute processing in accordance with the processing request obtained by the decryption.

The technique of acquiring the processing request by the processing request acquisition section 1313 is not particularly limited, and, for example, in the case where a value set at a predetermined position of the wireless signal received by the reception section 110 is a value indicating the processing request, the request acquisition section 131 can acquire the wireless signal extracted as the processing request.

The processing executed by the processing execution section 137 is not particularly limited, and there is assumed, as processing in which the security level is relatively high, processing of electronic payment handling personal information of the user U, or the like. As for recording processing of a TV program or the like, it is assumed to be processing in which the security level is relatively low.

The system used when encrypting or decrypting the processing request using the key 142 is not particularly limited, and, for example, a common key cryptography can be used. As examples of the common key cryptography, there can be used an AES (Advanced Encryption Standard) and a DES (Data Encryption Standard).

The transmission power determination section 134 may register, in the storage section 140, the key-dividing number included in the key transmission request acquired by the key transmission request acquisition section 1311. In that case, the processing request acquisition section 1313 acquires, from the wireless signal received by the reception section 110, an encrypted processing request obtained by encrypting a processing request, using a key generated by the operation terminal 200 by performing a bitwise exclusive OR with respect to all of each of the key fragments. The processing execution section 137 decrypts the encrypted processing request using a key generated by performing a bitwise exclusive OR with respect to all of each of the key fragments obtained by dividing the key 142 stored in the storage section 140 into the key-dividing number stored in the storage section 140. Then, the processing execution section 137 executes processing in accordance with the processing request obtained by the decryption.

The storage section 140 may further store an application which is activated for executing the processing by the processing execution section 137, and the security level determination section 133 may determine the transmission security level in accordance with the type of the application. For example, in the case where an application handling electronic payment processing is activated, as an example in which the security level is relatively high, a high value may be determined as the transmission security level. Further, for example, in the case where an application handling recording processing is activated, as an example in which the security level is relatively low, a low value may be determined as the transmission security level.

Further, the information processing apparatus 100 may further include a pairing request acquisition section 1312, a pairing processing section 136, and a key-requesting terminal determination section 132. In that case, before receiving the key transmission request, the reception section 110 further receives a pairing request including model identification information for identifying the model of the operation terminal 200 and operation terminal identification information for identifying the operation terminal 200, from the operation terminal 200 via a wireless signal. The pairing request acquisition section 1312 may acquire the pairing request from the wireless signal received by the reception section 110; in the case where the model identification information included in the pairing request acquired by the pairing request acquisition section 1312 is predetermined model identification information, the pairing processing section 136 may register the operation terminal identification information as communication-allowed terminal information in the storage section 140; the key-requesting terminal determination section 132 may determine whether the operation terminal identification information included in the key transmission request acquired by the key transmission request acquisition section 1311 is registered as the communication-allowed terminal information in the storage section 140; and, in the case where the key-requesting terminal determination section 132 determines that the operation terminal identification information included in the key transmission request is not registered as the communication-allowed terminal information in the storage section 140, the transmission section 160 may not transmit each key fragment to the operation terminal 200 via a wireless signal.

The technique of acquiring the pairing request by the pairing request acquisition section 1312 is not particularly limited, and, for example, in the case where a value set at a predetermined position of the wireless signal received by the reception section 110 is a value indicating the pairing request, the pairing request acquisition section 1312 can acquire the wireless signal extracted as the pairing request.

As the model identification information for identifying the model of the operation terminal 200, there can be used information for identifying the manufacturer of the operation terminal 200, information for identifying the type of the operation terminal 200, and information indicating the version of the operation terminal 200, for example. Further, as the operation terminal identification information for identifying the operation terminal 200, there can be used the MAC address of the operation terminal 200 and the like.

The predetermined model identification information is not particularly limited, and, for example, in the case where the storage section 140 stores information for identifying the manufacturer of the information processing apparatus 100, the predetermined model identification information can be the information for identifying the manufacturer of the information processing apparatus 100. In that case, for example, in the case where the manufacturer of the operation terminal 200 is different from the manufacturer of the information processing apparatus 100, the information processing apparatus 100 may not transmit a key to the operation terminal 200.

In the case where the pairing request further includes performance information indicating the performance of the operation terminal 200, the pairing processing section 136 may further register the performance information in association with the communication-allowed terminal information in the storage section 140. The security level determination section 133 may determine the transmission security level in accordance with the performance information registered in association with the communication-allowed terminal information in the storage section 140. In this way, for example, the security level determination section 133 determines a high transmission security level for the operation terminal 200 having relatively high reception performance of a wireless signal, and determines a low transmission security level for the operation terminal 200 having relatively low reception performance of a wireless signal.

The transmission power determination section 134 may register, in the storage section 140, the key-dividing number included in the key transmission request acquired by the key transmission request acquisition section 1311 and the determined transmission power, as a previous key-dividing number and a previous transmission power, respectively. In that case, when the processing execution section 137 is unsuccessful in decrypting the encrypted processing request, the transmission power determination section 134 acquires once again the key-dividing number included in the key transmission request acquired by the key transmission request acquisition section 1311. The transmission power determination section 134 may calculate the difference value between the acquired key-dividing number and the previous key-dividing number registered in the storage section 140, and, in the case where the calculated difference value is equal to or less than a predetermined value, may determine the transmission power as a value larger than the previous transmission power registered in the storage section 140. In this way, the reason why the transmission of the key has been unsuccessful is regarded as a shortage of the transmission power, and the shortage of the transmission power used when transmitting the key once again can be resolved.

Further, the storage section 140 further stores environment identification information for identifying the environment in which the own device is installed, and the security level determination section 133 may determine the transmission security level in accordance with the environment identification information. For example, in the case where the information processing apparatus 100 is installed in an area in which radio wave propagation is relatively poor because there are many buildings in the surroundings, a value for determining a low transmission security level can be set in the environment identification information. Further, for example, in the case where the information processing apparatus 100 is installed in an area in which radio wave propagation is relatively good because there are not many buildings in the surroundings, a value for determining a high transmission security level can be set in the environment identification information.

Further, for example, in the case where the information processing apparatus 100 is installed in an area in which it is difficult for the monitor B to intercept the key because the distance to the house next door is relatively long (or a wall W between the information processing apparatus 100 and the house next door is thick), a value for determining a low transmission security level can be set in the environment identification information. Further, for example, in the case where the information processing apparatus 100 is installed in an area in which it is easy for the monitor B to intercept the key because the distance to the house next door is relatively short (or the wall W between the information processing apparatus 100 and the house next door is thin), a value for determining a high transmission security level can be set in the environment identification information. The environment identification information may be stored in the storage section 140 at the stage in which the information processing apparatus 100 is manufactured by a manufacturer, or may be registered in the storage section 140 using the operation terminal 200 by the user U after the information processing apparatus 100 is manufactured by the manufacturer, for example. Further, for example, the environment identification information stored in the storage section 140 at the stage of being manufactured by the manufacturer may be changed by the operation terminal 200 of the user U.

The security level determination section 133 may determine the transmission security level in accordance with a reception power of the wireless signal at the time when the reception section 110 receives the key transmission request via the wireless signal. In this way, for example, in the case where the reception power of the wireless signal at the time of receiving the key transmission request is relatively large, the security level determination section 133 determines that the operation terminal 200 is present near to the information processing apparatus 100, and can determine a high transmission security level. Further, for example, in the case where the reception power of the wireless signal at the time of receiving the key transmission request is relatively small, the security level determination section 133 determines that the operation terminal 200 is not present near the information processing apparatus 100, and can determine a low transmission security level.

The information processing apparatus 100 may further include the display section 170 and the display control section 139. Further, the display control section 139 may cause the display section 170 to display at least one of the transmission security level determined by the security level determination section 133, the key-dividing number included in the key transmission request acquired by the key transmission request acquisition section 1311, or the transmission power determined by the transmission power determination section 134. Further, the display control section 139 may cause the display section 170 to display a message that the security of communication between the information processing apparatus 100 and the operation terminal 200 is maintained.

In addition thereto, the display control section 139 may cause the display section 170 to display appropriately a result of pairing processing executed by the pairing processing section 136 and a result of processing executed by the processing execution section 137.

[1-6. Configuration of Operation Terminal]

Figure 6:
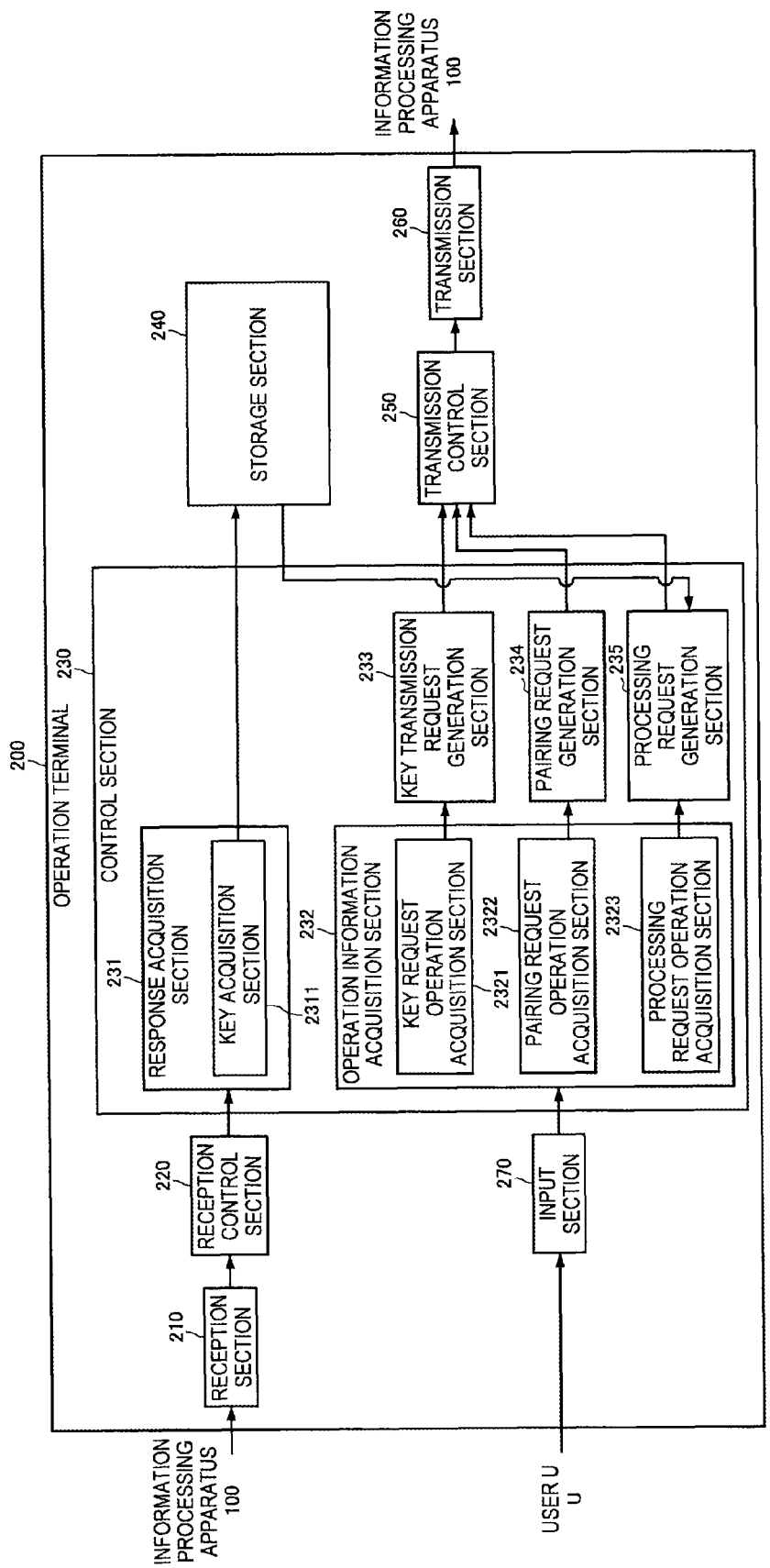
FIG. 6 is a diagram showing a configuration of an operation terminal according to the present embodiment.

FIG. 6 is a diagram showing a configuration of the operation terminal according to the present embodiment. With reference to FIG. 6 (refer to other figures as appropriate), the operation terminal according to the present embodiment will be described.

As shown in FIG. 6, the operation terminal 200 includes at least a reception section 210, a control section 230, a storage section 240, and a transmission section 260. Further, the operation terminal 200 includes, as necessary, a reception control section 220, a transmission control section 250, an input section 270, and the like. The input section 270 is capable of accepting an input of operation information from the user U by button operation or the like, for example.

Further, the control section 230 includes at least a response acquisition section 231 and a key transmission request generation section 233, and includes, as necessary, a pairing request generation section 234, a processing request generation section 235, an operation information acquisition section 232, and the like. The response acquisition section 231 includes at least a key acquisition section 2311. The control section 230 is configured from, for example, a CPU, a RAM, and the like, and the function thereof is realized by reading and developing in the RAM a program stored in the storage section 240 and executing the program developed in the RAM. Further, the control section 230 may be configured from dedicated hardware, for example. The operation information acquisition section 232 includes a key request operation acquisition section 2321, a pairing request operation acquisition section 2322, a processing request operation acquisition section 2323, and the like.

The key transmission request generation section 233 generates a key transmission request including a key-dividing number. In the case where the operation terminal 200 includes the input section 270 and the key request operation acquisition section 2321, the input section 270 accepts the input of a key transmission request operation from the user U, and the key request operation acquisition section 2321 acquires the key transmission request operation from the input section 270 and outputs the key transmission request operation to the key transmission request generation section 233. The key transmission request generation section 233 generates the key transmission request based on the key transmission request operation output from the key request operation acquisition section 2321.

The transmission section 260 is configured from an antenna or the like, and transmits a wireless signal to the information processing apparatus 100. The transmission section 260 transmits the key transmission request to the information processing apparatus 100 via the wireless signal, for example.

The reception section 210 is configured from an antenna or the like that is the same as or different from the transmission section 260, and receives the wireless signal from the information processing apparatus 100. The reception section 210 receives each key fragment obtained by being divided into the key-dividing number by the information processing apparatus 100 from the information processing apparatus 100, for example.

The key acquisition section 2311 generates a key based on each key fragment received by the reception section 210, and registers the generated key in the storage section 240. As described above, although the key acquisition section 2311 generates the key by performing a bitwise exclusive OR of the key fragments (key fragment F1, F2, . . . FN), the way of generating the key is not limited to the technology of performing the exclusive OR.

The pairing request generation section 234 generates a pairing request. In the case where the operation terminal 200 includes the input section 270 and the pairing request operation acquisition section 2322, the input section 270 accepts the input of a pairing request operation from the user U, and the pairing request operation acquisition section 2322 acquires the pairing request operation from the input section 270 and outputs the pairing request operation to the pairing request generation section 234. The pairing request generation section 234 generates the pairing request based on the pairing request operation output from the pairing request operation acquisition section 2322.

The processing request generation section 235 generates a processing request, and also generates an encrypted processing request obtained by encrypting the generated processing request using the key registered in the storage section 140. In the case where the operation terminal 200 includes the input section 270 and the processing request operation acquisition section 2323, the input section 270 accepts the input of a processing request operation from the user U, and the processing request operation acquisition section 2323 acquires the processing request operation from the input section 270 and outputs the processing request operation to the processing request generation section 235. The processing request generation section 235 generates the processing request based on the processing request operation output from the processing request operation acquisition section 2323.

The reception control section 220 performs, to the wireless signal received by the reception section 210, frequency conversion from a high-frequency signal into a baseband signal by downconversion as necessary, and demodulates the frequency-converted baseband signal. Further, in the case where the control section 230 performs processing using a digital signal, the reception control section 220 converts an analog signal obtained by the demodulation into a digital signal.

In the case where the control section 230 performs processing using a digital signal, the transmission control section 250 converts a digital signal to be transmitted into an analog signal. Further, the transmission control section 250 modulates the analog signal as necessary, performs frequency conversion from the baseband signal obtained by the modulation into a high-frequency signal by upconversion, and outputs the high-frequency signal to the transmission section 260.

[1-7. Configuration Example of Association Information Held by Information Processing Apparatus]

FIG. 7 is a diagram showing a configuration example of association information held by the information processing apparatus. With reference to FIG. 7 (refer to other figures as appropriate), the configuration example of association information held by the information processing apparatus will be described.

As shown in FIG. 7, the association information 141 is formed by associating the key-dividing number, the security level, and the transmission power with each other, for example. In the example shown in FIG. 7, when the key-dividing number is represented by N, in the case where the key-dividing number N is "any" and the security level is "normal", the transmission power is set to information indicating "not adjusted". In the same manner, in the case where the key-dividing number N is "N>10" and the security level is "low", the transmission power is set to information indicating "not adjusted", and, in the case where the key-dividing number N is "N≥100" and the security level is "high", the transmission power is set to information indicating "not adjusted".

Further, in the example shown in FIG. 7, in the case where the key-dividing number N is "N<100" and the security level is "high", the transmission power is set to information indicating "decreased". Further, in the case where the key-dividing number N is "N≤10" and the security level is "low", the transmission power is set to information indicating "increased".

Note that the example shown in FIG. 7 merely represents an example of the association information 141. For example, the security level is not limited to the case of being classified into three levels of "low", "normal", and "high", and there may be a case of being classified into five levels of "low", "slightly low", "normal", "slightly high", and "high". Further, a threshold for the key-dividing number N is set to "10", "100", or the like, but is not limited to those values.

[1-8. Flow of Processing Executed by Information Processing System]

Figure 8:
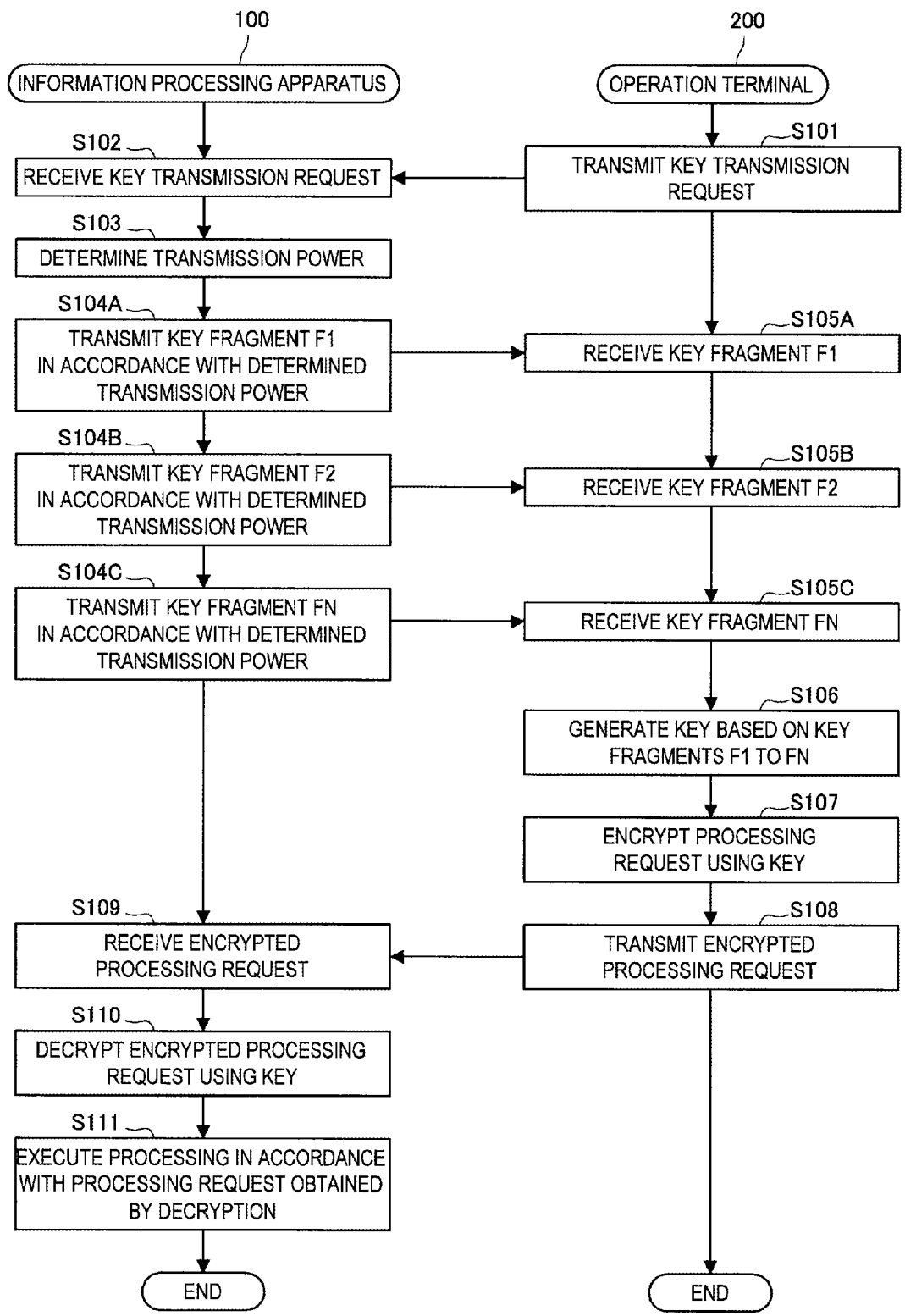
FIG. 8 is a sequence diagram showing a flow of processing executed by the information processing system.

FIG. 8 is a sequence diagram showing a flow of processing executed by the information processing system. With reference to FIG. 8 (refer to other figures as appropriate), the flow of processing executed by the information processing system will be described. In FIG. 8, there is shown the flow of processing executed in the case where the key-dividing number N is included in the key transmission request. Further, details about Step S102 and Steps S104A to S104C of the information processing apparatus 100 will be described below with reference to FIG. 9.

As shown in FIG. 8, the operation terminal 200 transmits a key transmission request to the information processing apparatus 100 (Step S101). The information processing apparatus 100 receives the key transmission request (Step S102), and determines the transmission power (Step S103).

The information processing apparatus 100 transmits a key fragment F1 to the operation terminal 200 in accordance with the determined transmission power (Step S104A). The operation terminal 200 receives the key fragment F1 from the information processing apparatus 100 (Step S105A). In the same manner, the information processing apparatus 100 transmits a key fragment F2 to the operation terminal 200 in accordance with the determined transmission power (Step S104B). The operation terminal 200 receives the key fragment F2 from the information processing apparatus 100 (Step S105B). The information processing apparatus 100 transmits a key fragment FN to the operation terminal 200 in accordance with the determined transmission power (Step S104C). The operation terminal 200 receives the key fragment F2 from the information processing apparatus 100 (Step S105C). Although not shown in FIG. 8, the processes in which the information processing apparatus 100 transmits key fragments F3 to FN-1 to the operation terminal 200 in accordance with the determined transmission power and the processes in which the operation terminal 200 receives the key fragments F3 to FN-1 from the information processing apparatus 100 are executed in the same manner.

The operation terminal 200 generates a key based on the received key fragments F1 to FN (Step S106), and encrypts a processing request using the generated key (Step S107). The key can be generated by performing a bitwise exclusive OR of the key fragments as described above, for example. The operation terminal 200 transmits the processing request that is encrypted to the information processing apparatus 100 (Step S108).

The information processing apparatus 100 receives the processing request which has been encrypted from the operation terminal 200 (Step S109), and decrypts the received processing request which has been encrypted using the key (Step S110). The information processing apparatus 100 executes processing in accordance with the processing request obtained by the decryption (Step S111).

[1-9. Flow of Processing Executed by Information Processing Apparatus]

Figure 9:
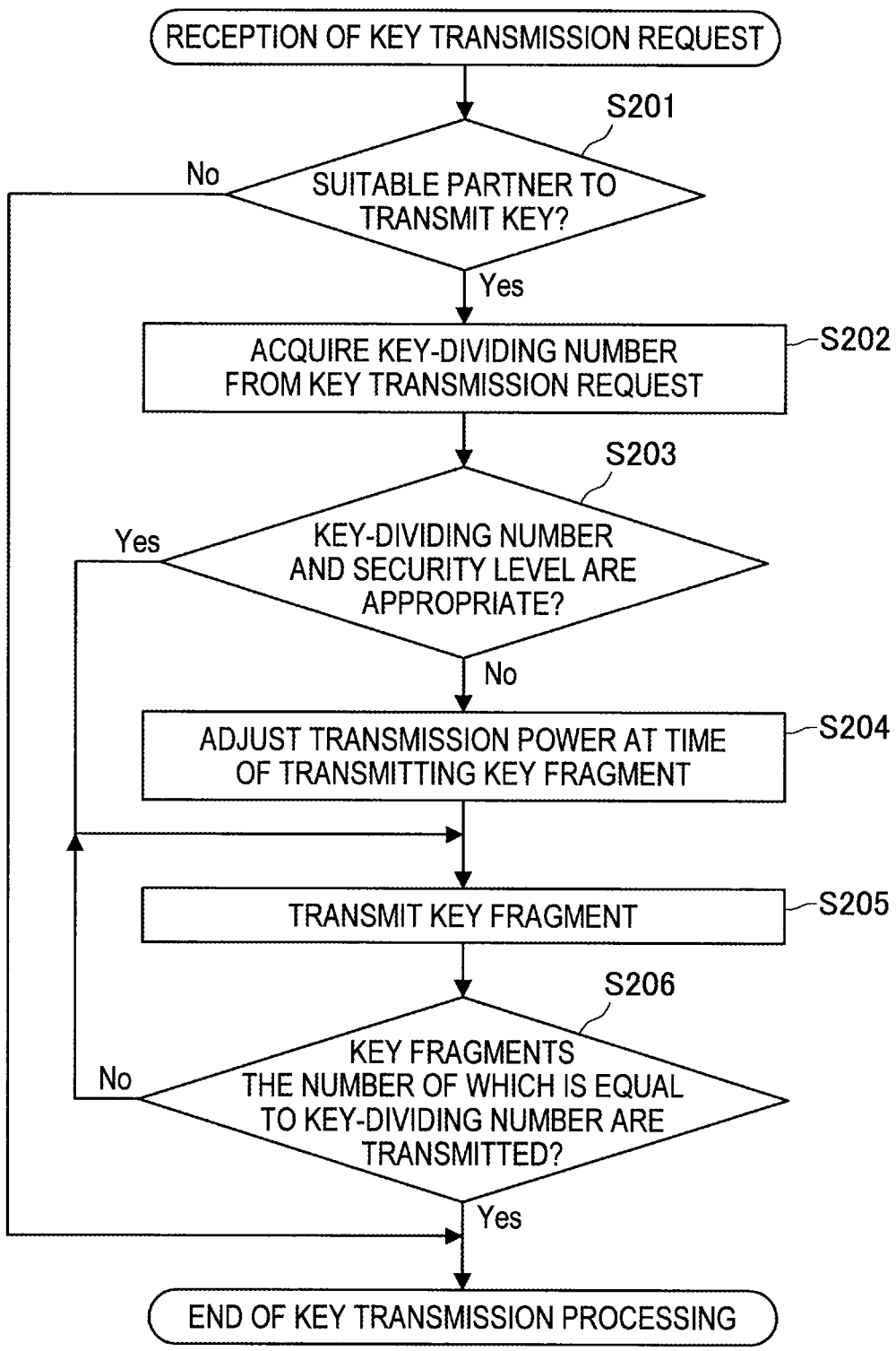
FIG. 9 is a flowchart showing a flow of processing executed by the information processing apparatus.

FIG. 9 is a flowchart showing a flow of processing executed by the information processing apparatus. With reference to FIG. 9 (refer to other figures as appropriate), the flow of processing executed by the information processing apparatus will be described.

As shown in FIG. 9, with reception of the key transmission request, the information processing apparatus 100 determines whether a transmission source of the key transmission request is suitable as a transmission partner of the key (Step S201). The determination on whether it is appropriate as the transmission partner of the key may be performed, for example as described above, by determining, by the key-requesting terminal determination section 132, whether the operation terminal identification information included in the key transmission request acquired by the key transmission request acquisition section 1311 is registered in the storage section 140 as the communication-allowed terminal information.

In the case of determining that the transmission source of the key transmission request is not appropriate as the transmission partner of the key ("No" in Step S201), the information processing apparatus 100 completes the key transmission processing without transmitting the key. In the case of determining that the transmission source of the key transmission request is appropriate as the transmission partner of the key ("Yes" in Step S201), the information processing apparatus 100 acquires a key-dividing number from the key transmission request (Step S202), and determines whether the acquired key-dividing number and a security level are appropriate (Step S203). The security level is determined using various techniques by the security level determination section 133 of the information processing apparatus 100, as described above.

In the case of determining that the key-dividing number and the security level are appropriate ("Yes" in Step S203), the information processing apparatus 100 proceeds to Step S205. In the case of determining that the key-dividing number and the security level are not appropriate ("No" in Step S203), the information processing apparatus 100 adjusts the transmission power at the time of transmitting a key fragment (Step S204) and proceeds to Step S205.

The information processing apparatus 100 transmits the key fragment to the operation terminal 200 (Step S205), and determines whether the key fragments the number of which is equal to the key-dividing number are transmitted (Step S206). In the case of determining that the key fragments the number of which is equal to the key-dividing number are not transmitted ("No" in Step S206), the information processing apparatus 100 returns to Step S205 in order to transmit the following key fragments to the operation terminal 200. In the case of determining that the key fragments the number of which is equal to the key-dividing number are transmitted ("Yes" in Step S206), the information processing apparatus 100 completes the key transmission processing.

2. Modified Example

The preferred embodiments of the present invention have been described above with reference to the accompanying drawings, whilst the present invention is not limited to the above examples, of course. A person skilled in the art may find various alternations and modifications within the scope of the appended claims, and it should be understood that they will naturally come under the technical scope of the present invention.

For example, although in the present embodiment, a plaintext bit string that is not encrypted is used for the key itself, an encrypted key may also be used.

Further, although in the present embodiment, the description has been made of the example in which the display control section 139 of the information processing apparatus 100 causes the display section 170 to display at least one of the transmission security level, the key-dividing number, or the transmission power, the operation terminal 200 may display those pieces of information. In that case, for example, the information processing apparatus 100 may transmit a key transmission completion notification including at least one of the transmission security level, the key-dividing number, or the transmission power, to the operation terminal 200. Then, a display control section included in the operation terminal 200 may cause a display section included in the operation terminal 200 to display at least one of the transmission security level, the key-dividing number, or the transmission power, which are included in the received key transmission completion notification. Further, the display control section included in the operation terminal 200 may cause the display section included in the operation terminal 200 to display a message that the security of communication between the information processing apparatus 100 and the operation terminal 200 is maintained.

3. Summary

According to the first embodiment, it becomes possible for the information processing apparatus 100 to have the right to determine the security strength of communication between the operation terminal 200 and the information processing apparatus 100, in the information processing system 10 in which the key is divided in accordance with the key-dividing number specified by the operation terminal 200 and returned by the information processing apparatus 100. Accordingly, the imbalance in the right to determine the security strength of communication between the operation terminal 200 and the information processing apparatus 100 can be resolved.

Further, since the information processing apparatus 100 can determine the transmission power to be used at the time of transmitting the key, it becomes possible to increase the security strength of communication between the operation terminal 200 and the information processing apparatus 100 by transmitting, by the information processing apparatus 100, the key with a lower transmission power.

Further, since the information processing apparatus 100 can determine the transmission power to be used at the time of transmitting the key, it becomes possible to enhance the success rate of key transmission to the operation terminal 200 by transmitting, by the information processing apparatus 100, the key with a higher transmission power.

Reference Signs List

10 Information processing system
100 Information processing apparatus
110 Reception section
120 Reception control section
130 Control section
131 Request acquisition section
1311 Key transmission request acquisition section
1312 Pairing request acquisition section
1313 Processing request acquisition section
132 Key-requesting terminal determination section
133 Security level determination section
134 Transmission power determination section
135 Key acquisition section
136 Pairing processing section
137 Processing execution section
139 Display control section
140 Storage section
141 Association information
142 Key
150 Transmission control section
160 Transmission section
170 Display section
200 Operation terminal
210 Reception section
220 Reception control section
230 Control section
231 Response acquisition section
2311 Key acquisition section
232 Operation information acquisition section
2321 Key request operation acquisition section
2322 Pairing request operation acquisition section
2323 Processing request operation acquisition section
233 Key transmission request generation section
234 Pairing request generation section
235 Processing request generation section
240 Storage section
250 Transmission control section
260 Transmission section
270 Input section

The invention claimed is:

1. An information processing device comprising:
circuitry configured to
acquire a key transmission request from a signal received from a counterpart information processing device, the key transmission request including a key-dividing number;
determine a security level at a time of transmission of a key used for encrypting or decrypting data to, or from, the counterpart information processing device, the security level being a transmission security level;
determine a transmission power based on associated values of the transmission security level and the key-dividing number;
acquire one or more key fragments by dividing the key into the key-dividing number; and
transmit the one or more acquired key fragments using the determined transmission power via a wireless signal to the counterpart information processing device.

2. The information processing device according to claim 1, further comprising a storage section configured to store the key.

3. The information processing apparatus according to claim 2,
wherein the storage section further stores a first key-dividing number and a first security level, and
wherein the circuitry further acquires the first key-dividing number and the first security level which are stored in the storage section, and, in a case where a first condition is satisfied, the first condition being that the transmission security level is equal to or higher than the first security level and the key-dividing number included in the key transmission request is smaller than the first key-dividing number, determines the transmission power as a value that is smaller than the transmission power used in a case where the first condition is not satisfied.

4. The information processing apparatus according to claim 3,
wherein the storage section further stores a second key-dividing number and a second security level, and
wherein the circuitry acquires the second key-dividing number and the second security level which are stored in the storage section, and, in a case where a second condition is satisfied, the second condition being that the transmission security level is equal to or lower than the second security level and the key-dividing number included in the key transmission request is equal to or larger than the second key-dividing number, determines the transmission power to be a value that is larger than the transmission power used in a case where the second condition is not satisfied.

5. The information processing apparatus according to claim 2, further comprising:
a processing request acquisition section; and
a processing execution section,
wherein, after receiving the key transmission request, the circuitry further receives an encrypted processing request obtained by encrypting a processing request using a key based on the acquired one or more key fragments, via a wireless signal,
wherein the processing request acquisition section acquires the encrypted processing request from the wireless signal, and
wherein the processing execution section decrypts the encrypted processing request using the key stored in the storage section, and executes processing in accordance with a processing request obtained by the decryption.

6. The information processing apparatus according to claim 5,
wherein the circuitry registers, in the storage section, the key-dividing number included in the acquired key transmission request,
wherein the processing request acquisition section acquires, from the wireless signal, an encrypted processing request obtained by encrypting a processing request, using a key generated by performing a bitwise exclusive OR with respect to all the acquired one or more key fragments, and
wherein the processing execution section decrypts the encrypted processing request using a key generated by performing a bitwise exclusive OR with respect to all of the acquired one or more key fragments obtained by dividing the key stored in the storage section into the key-dividing number stored in the storage section, and executes processing in accordance with a processing request obtained by the decryption.

7. The information processing apparatus according to claim 5,
wherein the storage section further stores an application which is activated for executing the processing by the processing execution section, and
wherein the circuitry determines the transmission security level in accordance with a type of the application.

8. The information processing apparatus according to claim 2, further comprising:
a pairing request acquisition section;
a pairing processing section; and
a key-requesting terminal determination section,
wherein, before receiving the key transmission request, the circuitry further receives a pairing request including model identification information for identifying a model of an operation terminal and operation terminal identification information for identifying the operation terminal, from the operation terminal via a wireless signal,
wherein the pairing request acquisition section acquires the pairing request from the received wireless signal,
wherein, in a case where the model identification information included in the pairing request acquired by the pairing request acquisition section is predetermined model identification information, the pairing processing section registers the operation terminal identification information as communication-allowed terminal information in the storage section,
wherein the key-requesting terminal determination section determines whether operation terminal identification information included in the key transmission request is registered as the communication-allowed terminal information in the storage section, and
wherein, in a case where the key-requesting terminal determination section determines that the operation terminal identification information included in the key transmission request is not registered as the communication-allowed terminal information in the storage section, the circuitry does not transmit the acquired one or more key fragments to the operation terminal via a wireless signal.

9. The information processing apparatus according to claim 8,
wherein, in a case where the pairing request further includes performance information indicating performance of the operation terminal, the pairing processing section further registers the performance information in association with the communication-allowed terminal information in the storage section, and
wherein circuitry determines the transmission security level in accordance with the performance information registered in association with the communication-allowed terminal information in the storage section.

10. The information processing apparatus according to claim 2,
wherein the circuitry:
registers, in the storage section, the key-dividing number included in the key transmission request and the determined transmission power as a previous key-dividing number and a previous transmission power, respectively;
in a case where the circuitry is unsuccessful in decrypting an encrypted processing request, acquires once again the key-dividing number included in the acquired key transmission request;
calculates a difference value between the acquired key-dividing number and the previous key-dividing number registered in the storage section; and,
in a case where the calculated difference value is equal to or less than a predetermined value, determines as a value larger than the previous transmission power registered in the storage section.

11. The information processing apparatus according to claim 2,
wherein the storage section further stores environment identification information for identifying an environment in which an own device is installed, and
wherein the circuitry determines the transmission security level in accordance with the environment identification information.

12. The information processing apparatus according to claim 1, wherein the circuitry determines the transmission security level in accordance with a reception power of the wireless signal at a time when the key transmission request is received via the wireless signal.

13. The information processing apparatus according to claim 1, further comprising:
a display section; and
a display control section,
wherein the display control section causes the display section to display at least one of the determined transmission security level, the key-dividing number included in the key transmission request or the determined transmission power.

14. A method, comprising:
acquiring, at an information processing device, a key transmission request from a signal received from a counterpart information processing device, the key transmission request including a key-dividing number;
determining, at the information processing device, a security level at a time of transmission of a key used for encrypting or decrypting data to, or from, the counterpart information processing device, the security level being a transmission security level;
determining, at the information processing device, a transmission power in based on associated values of the transmission security level and the key-dividing number;
acquiring, at the information processing device, one or more key fragments by dividing the key into the key-dividing number;
and transmitting the one or more acquired key fragments using the determined transmission power via a wireless signal from the information processing device to the counterpart information processing device.

15. A non-transitory computer-readable storage medium having stored thereon instructions which, when executed by a processor, perform a method, comprising:
acquiring a key transmission request from a signal received from a counterpart information processing device, the key transmission request including a key-dividing number;
determining a security level at a time of transmission of a key used for encrypting or decrypting data to, or from, the counterpart information processing device, the security level being a transmission security level;
determining a transmission power based on associated values of the transmission security level and the key-dividing number;
acquiring one or more key fragments by dividing the key into the key-dividing number;
and transmitting the one or more acquired key fragments using the determined transmission power via a wireless signal to the counterpart information processing device.

* * * * *